United States Patent [19]

Lenchin et al.

[11] Patent Number: 4,529,607
[45] Date of Patent: Jul. 16, 1985

[54] PROCESS FOR COATING FOODSTUFF WITH BATTER CONTAINING HIGH AMYLOSE FLOUR FOR MICROWAVE COOKING

[75] Inventors: Julianne M. Lenchin, Cranbury; Harvey Bell, Martinsville, both of N.J.

[73] Assignee: National Starch and Chemical Corporation, Bridgewater, N.J.

[21] Appl. No.: 625,384

[22] Filed: Jun. 28, 1984

Related U.S. Application Data

[63] Continuation-in-part of Ser. No. 531,966, Sep. 14, 1983, abandoned.

[51] Int. Cl.³ .............................................. A21D 10/04
[52] U.S. Cl. ..................................... 426/94; 426/243; 426/302; 426/552; 426/549; 426/89; 426/92
[58] Field of Search ................................. 426/552–555, 426/241, 243, 302, 94, 89, 92

[56] References Cited

U.S. PATENT DOCUMENTS

| | | | |
|---|---|---|---|
| Re. 27,531 | 12/1972 | Murray et al. | 426/555 |
| 3,052,545 | 9/1962 | Ducharme et al. | 426/555 |
| 3,208,851 | 9/1965 | Antinori et al. | 426/555 |
| 3,956,515 | 5/1976 | Moore et al. | 426/302 |
| 4,342,788 | 8/1982 | Clatfelter | 426/243 |
| 4,427,706 | 1/1984 | El-Hag | 426/243 |

*Primary Examiner*—Raymond Jones
*Assistant Examiner*—Elizabeth A. King
*Attorney, Agent, or Firm*—Edwin M. Szala; Lori D. Tolly

[57] ABSTRACT

Frozen pre-fried convenience foodstuffs characterized by improved crispness are produced after foodstuffs coated with batter containing an effective amount of high amylose flour are partially cooked in hot fat or cooking oil, and subsequently cooked to completion by means of microwaving.

11 Claims, No Drawings

PROCESS FOR COATING FOODSTUFF WITH BATTER CONTAINING HIGH AMYLOSE FLOUR FOR MICROWAVE COOKING

This application is a continuation-in-part of application Ser. No. 531,966 filed Sept. 14, 1983, now abandoned.

BACKGROUND OF THE INVENTION

This invention relates to the use of flours which possess large amounts of amylose in batter mix compositions and the improved crispness provided to breaded and non-breaded convenience foodstuffs which are coated with the batter mix, pre-fried, frozen, and then later cooked in a microwave oven.

Batter coated fried foods have a broad appeal. Among the most popular batter coated foods are fried chicken and fish as well as other meat products; however, a wide variety of other foods, such as vegetables, and even fruits can be coated and then cooked by frying. Deep-fried food batters, whether for use with fresh or frozen foods, consist primarily of farinaceous materials such as starches and/or flours along with other optional ingredients such as egg solids, baking powder, cream of tartar, preservatives, seasonings, coloring matter and milk solids. These mixtures are combined with water so as to obtain a desired coating viscosity whereupon they are applied to the food ordinarily by means of a dip, spray or cascade technique. Before frying, the batter coated food may be coated with a breading such as corn meal, cracker crumbs, bread crumbs or the like if so desired.

Because of the great popularity of batter coated fried foods, there are presently a number of batter formulations and coating procedures. See, for example, U.S. Pat. No. Re. 27,531 to Murray et al. reissued on Dec. 12, 1972 which describes the use of amylose, obtained either from the fractionation of whole starch or from starch composed of at least 55% amylose, in coating deep-fried potato products. High amylose starch is useful as a coating material for foodstuffs due to its ability to provide uniform films which, if fried, aid in reducing oil absorption and provide crispness to the foodstuff as well.

U.S. Pat. No. 3,052,545 issued on Sept. 4, 1962 to J. Ducharme et al. describes a batter mix for breaded deep-fried foodstuffs comprising a chemically inhibited starch product. A wide variety of starches crosslinked to an acceptable level are said to provide a high degree of adhesion between the breading and the food piece to be coated while possessing strong cohesive strength during deep-frying.

U.S. Pat. No. 3,208,851 issued on Sept. 28, 1965 to J. Antinori et al. also describes batter mixes for breaded deep-fried foodstuffs which possess improved adhesion and cohesion when starches subjected to a dry oxidation process are employed in the batter mix.

In order to obtain a fried product, a batter-coated food piece must be cooked in the presence of frying oils or melted fat at elevated temperatures. Foods thus prepared may be immediately consumed or may be packaged and quick frozen so that the ultimate consumer may prepare the foodstuff merely by reheating. In many cases, the food may only receive a partial cooking or "pre-frying" at this point, whereupon it is packaged and quick frozen with the cooking of the pre-fried frozen foodstuff completed at a later time by the consumer.

Many batters have been formulated to prepare frozen, uncooked batter coated or breaded foodpieces which are meant to be subsequently fried. See, for example, U.S. Pat. No. 3,956,515 issued on May 11, 1976 to C. Moore et al. which describes starch batters that can be applied upon the surface of a food piece, breaded and frozen, and subsequently deep fat fried. The starch batters are composed of ungelatinized granular starches and granular cold-water swelling starches.

A growing trend to spend less time on food preparation has lead to a great demand for time-saving "ready-to-heat" frozen food products now on the market. The wide use of microwave ovens, now a standard feature in many homes and restaurants, has further led to reduction in cooking time spent by consumers. Many products cooked by means of microwaving or baking are indistinguishable from each other. Unfortunately, frozen pre-fried foodstuffs show strong differences when comparisons are made between final products which have been fried, baked and most particularly microwaved. Microwaved pre-fried products tend to be undesirably soggy, and as such, should not be recommended for microwaving.

It is generally known that batter mixes formulated to provide crispy fried products or pre-fried products which are to be later baked do not produce crispy pre-fried products if microwaved instead. There are at least two reasons for which the inferiority of the microwaved products may be attributed.

Firstly, the transfer of heat to a food piece during frying or baking is opposite that for microwaving. Microwave radiation cooks food pieces by heating the water contained therein which in turn acts to cook the entire piece. For this reason, it is often explained that microwave radiation cooks products from the interior outwards, resulting in the coating of a pre-fried piece being the last part to be cooked. During microwaving, the moisture in the food piece is driven outwards towards the surface, which can cause the food piece to become soggy. During frying or baking, on the other hand, the outer coating receives the most exposure to cooking temperatures while the interior receives the least, thus providing a crispy outer coating.

Secondly, food pieces which are cooked in the presence of hot fat or oil by frying are usually cooked at temperatures of at least 350° F. (176° C.) to about 425° F. (218° C.), preferably 375°–395° F. (190°–202° C.) which are sufficiently high to fry the food piece. It is recommended that pre-fried food pieces be oven baked at comparable frying temperatures so that residual oil, contained on the surface of all pre-fried foods, will continue to cook the food piece. Microwave ovens, on the other hand, are limited to a cooking temperature that does not exceed the boiling point of water and thus, the residual oil retained on a food piece after pre-frying will not continue to cook the piece.

Recent unsuccessful attempts have been made to prepare acceptable pre-fried frozen foodstuffs which remain crispy even when microwaved. Unfortunately such attempts have provided products which demand excessive microwave cooking times, yielding unappealing foodstuffs which are drastically case-hardened. Such products have very hard outer coatings which are difficult to bite or even cut with a knife and are therefore an extreme solution to the problem of soggy products.

Although a batter mix which provides a crispy pre-fried food piece after microwaving is desired, the mix must additionally provide other properties in order to obtain an acceptable product. For example, the interface between the batter coating and food piece after microwaving should preferably be undifferentiable. The crispness of a food piece becomes overshadowed as the interface worsens by going from thin and dry to floury, bready and finally to pasty. Weepage is also an important concern. Fluid migration during freezing or microwaving due to gravity may result in the pooling of fluids on the underface of the product resulting in a product which is soggy beneath a crispy coating. The batter should also provide good adhesion and cohesion in order to sustain the pressure of moisture trying to escape during microwaving which can cause "blow outs" leaving a patchy coated food piece. Some batters produce a lacy uneven coating on food pieces. Such a trait is also undesirable because it leads to crumbly coatings. Additionally, the batter should provide a product with an acceptable and appealing final color.

Accordingly, it is an object of the present invention to provide a batter mix composition which may be used in the preparation of microwaveable frozen pre-fried foodstuffs which, when eventually cooked by microwaves provide a foodstuff with a crispy outer coating, a property which has recently found increased demand. None of the references mentioned above disclose or suggest the batter formulations of the present invention for use in providing crispy and appealing microwaveable pre-fried food pieces.

SUMMARY OF THE INVENTION

The present invention provides an improved batter mix composition for the preparation of batter coated pre-fried microwaveable foodstuffs wherein the improvement comprises the addition of an effective amount of high amylose flour to the batter mix. By employing such a batter mix composition, applied as an aqueous slurry, a coated foodstuff may receive a partial cooking or "pre-frying" whereupon the cooking of the foodstuff is later completed by means of microwaving. The use of high amylose flour in amounts greater than 50 to about 80 percent, preferably 60 to 70 percent, based on the weight of the dry batter mix, provides overall acceptable pre-fried convenience foodstuffs with crispy coatings after microwave cooking.

DESCRIPTION OF THE PREFERRED EMBODIMENTS

It is well known that starch is composed of two fractions, the molecular arrangement of one being linear and the other being branched. The linear fraction of starch is known as amylose and the branched fraction as amylopectin. Methods for separating starch into these two components are known. Starches from different sources, e.g. potato, corn, tapioca, and rice, etc., are characterized by different relative proportions of the amylose and amylopectin components. Some plant species have been genetically developed which are characterized by a large preponderance of the one fraction over the other. For instance, certain varieties of corn which normally contain 22–28% amylose have been developed which yield starch composed of over 50% amylose. These hybrid varieties have been referred to as high amylose corn or amylomaize.

Starch is obtained from corn by wet milling of the grain, a very specific well known integrated system developed for efficiently separating the major components of the corn kernel. Basically the process beings with the step of cleaning the grain to remove large and small pieces of cob, chaff, sand and other foreign material. The corn is then softened by steeping, thereby easing the liberation of the oil rich germ from the starch-containing endosperm. After degermination, the endosperm slurry is milled and the fiber (bran) subsequently removed. Finally, the low density protein-rich gluten in the difibered slurry is separated from the starch by means of settling or centrifugation. The remaining starch may then be collected by filtration.

On the other hand, flours produced from corn are produced by dry-milling of the grain. After similar cleaning and degermination steps, as described above, the corn is dried to a moisture content of about 15% from about 25%. The bran is removed by centrifugal-type aspirators, and the corn is subsequently milled and sifted to produce corn products containing starch and protein of varied coarseness including flakes, grits and meal in addition to flour.

High amylose corn hybrids were developed in order to naturally provide starches of high amylose content and have been available commercially since about 9163. We have now found that the flours of these hybrids, when added to batter mix compositions, surprisingly provide pre-fried foodstuffs with improved crispness after microwaving, a property which has been heretofore unattainable.

Suitable high amylose flours useful herein are those flours with an amylose content of at least 50% based on the total starch content of the flour. Although high amylose corn flour has been found to be especially suitable herein, this invention also encompasses high amylose flours derived from sources other than corn which contain concentrations of at least 50% amylose with similar results expected. Suitable flours would include those flours produced from any high amylose plant species of, for example, wheat, rice, rye, potato, oats, barley, pea and millet.

The present invention encompasses the use of high amylose flours which are modified, unmodified, or combinations of both and their use in batter mixes. Typical flour modifications include treatment with heat and/or acids or with oxidizing agents. The flour may also be chemically derivatized by means of esterification or etherification reactions. Preferred modified flours useful herein include acid converted dextrins of high amylose corn flour prepared by conventional techniques known in the art and described in the "Handbook of Water-Soluble Gums and Resins", Robert L. Davidson, editor, McGraw-Hill Book Co., New York (1980), pp. 34–36. It has been found that such dextrinized flour, preferably uncharred after dextrinization, when used in concentrations of about 1 part dextrin to about 4 to 6 parts, preferably 5 parts, of unmodified high amylose flour provide added crispness and improved interface to microwaved pre-fried foodstuffs. In higher concentrations, the dextrinized flour may cause unacceptable lacing resulting in crumbly coatings as well as cause the resultant foodstuff to be unacceptably dark in color. Moreover, when using the higher concentrations, it becomes increasingly difficult to achieve adequate pick-up of the batter onto a food piece.

In preparing the batter mixes herein, any suitable farinaceous material may be employed in addition to the high amylose flour. Such materials applicable in the process may include starches derived from such sources as corn, sago, wheat, rice, potato, sweet potato, waxy maize, high amylose corn, tapioca, sorghum, or waxy sorghum starch, as well as components from these starches, viz, amylose and amylopectin. Derivatives of the above including esterified, etherified, and converted starches are also applicable herein. Furthermore, flours derived from such sources as, for example, corn, wheat, or potato are also suitable in the batter compositions.

The amount of high amylose flour employed in the batter mix is normally in the range of greater than 50 percent to about 80 percent, based on the weight of the dry mix, and preferably in the range of 60 to 70 percent. In order to determine the most effective amount of high amylose flour necessary herein to provide improved crispness to frozen pre-fried foodstuffs, the inherent moisture of the foodstuff to be coated is often considered. A foodstuff with a higher moisture content will generally require more high amylose flour in the batter mix composition than one of a lower moisture content. For example, a coated fish piece (normally containing about 80% moisture), in order to have a crispy coating, will often require a batter mix containing more high amylose flour than would be necessary for coating a piece of chicken (normally containing about 70% moisture).

In the actual preparation of the batters, the practitioner need merely prepare an aqueous slurry of the dry mix. The slurry will ordinarily contain about 100 parts by weight of dry mix per 125 to 175 parts of water. The precise dry mix to water ratio will depend, of course, upon the type of foodstuff being prepared, the manner in which the batter mix is to be applied, and the particular mix composition being utilized. The slurry is then kept under agitation prior to its application to the foodstuff so as to prevent settling from occuring. The batter may thereupon be applied to the foodstuff which may be either fresh, par-boiled, or frozen and which may be optionally predusted with starch or flour. Chicken pieces are preferably par-boiled prior to batter application. Moreover, when preparing pre-fried chicken or fish, it is also preferable to first apply an appropriate pre-dust. Batter application may be carried out by any convenient procedure such as by dipping, spraying or cascading. After draining off the excess batter, breading may optionally be applied before the foodstuff is pre-fried. The foodstuff need only be fried for a period of about 0.5–1.5 minutes depending on the foodstuff, preferably 0.5–1.0 minutes.

It is unnecessary to heat the batter mix slurry prior to its application of the foodstuff. The practitioner may add such seasoning, extenders, preservatives, or food colors to the batter mix slurry as are desired.

This invention encompasses the preparation of batter-coated foodstuffs which do not contain breading, referred to in the art as having a tempura type coating. The process of applying breading to batter coated foodstuffs is also encompassed, herein referred to as single-pass coating. Common breading mixtures employed in such single-pass applications include bread crumbs, corn meal, cracker crumbs and the like.

The batter mix compositions herein may thus be used in the preparation of all types of pre-fried fresh and frozen foodstuffs which are to be frozen and later microwaved including fish, shell fish, poultry, meat and vegetable products including fish sticks, fish fillets, fish steaks, whole fish, scallops, oysters, clams, shrimps, lobster parts, chicken and turkey parts, veal, beef, pork, egg plant, and onion rings.

The examples which follow will further illustrate the embodiment of the present invention. In the examples, all parts are given by weight and all temperatures are given in both degrees Fahrenheit and Celsius. Unless otherwise noted, the fish used herein was haddock and the portions of chicken used were chicken thighs.

EXAMPLE 1

This example illustrates the differences in crispness observed between similarly prepared pre-fried chicken pieces which were coated with various batter compositions and cooked either by oven baking or by microwaving.

Tempura batters were formulated employing the dry batter mix recipes of Table I. The batters were prepared by adding 100 grams of each dry mix to 175 grams of water. The chicken pieces were par-boiled for 20 minutes, pre-dusted with wheat flour and then coated with batter. The coated chicken pieces were pre-fried in oil at 375° F. (190° C.) for 1 minute and then frozen. After 1 day the frozen chicken pieces were then either baked at 425° F. (218° C.) for 30 minutes (turning after 15 minutes) or microwaved for 4 minutes (rotating the chicken piece after 2 minutes). Batter compositions and texture comparisons may be found in Table I.

The results show that batters employed to provide crispy coatings to frozen pre-fried products cooked by oven baking do not necessarily produce similar crispy coatings to products cooked by microwave.

TABLE I

| INGREDIENTS | PARTS BATTER RECIPE | | |
|---|---|---|---|
| | A | B | C |
| Wheat Flour | 45 | 45 | 45 |
| High Amylose Corn Flour[a] | — | — | 27 |
| Corn Flour | 25 | 25 | 25 |
| Modified Corn Starch[b] | 27 | — | — |
| High Amylose Corn Starch[c] | — | 27 | — |
| Acid Sodium Aluminum Phosphate | 1.5 | 1.5 | 1.5 |
| Sodium Bicarbonate | 1.5 | 1.5 | 1.5 |
| Texture After Microwaving: | V. Soggy | Soggy | Sl. crisp |
| Texture After Baking: | Crisp | Crisp | V. crisp |

[a]The flour contained 70% amylose.
[b]Mildly oxidized corn starch which had been inhibited and acetylated with 2.7% by weight of an adipic-acetic mixed anhydride containing 1 part adipic acid and 9 parts acetic anhydride.
[c]The starch contained 70% amylose.

EXAMPLE 2

The example illustrates the effect of high amylose flour on microwaved pre-fried chicken thighs.

Dry batter mixes were formulated with 97% farinaceous material, 1.5% sodium bicarbonate and 1.5% acid sodium aluminum phosphate. The batters were prepared by initially adding 100 parts of dry batter mix to 160 parts of water. Additional water or dry mix was added to the batter to insure comparable (within 5%) batter coverage between samples. Chicken thighs which were par-boiled for 20 minutes and then skinned were dipped in tepid water, pre-dusted with corn flour, then dipped into a batter. The excess batter was allowed to drain off the chicken piece before frying. The pieces were pre-fried for 1 minute at 385° F. (196° C.). After draining, the pieces were immediately frozen. After two days of frozen storage, the thighs were reconstituted in the microwave. The pieces were cooked without turning or rotating for about 1.75 to 2.25 minutes until an internal temperature of 150° F. (66° C.) was attained. The pieces were then evaluated and rated (with a rating of 1 being the best) by a panel of four for overall crispness and interface. The results may be found in Table II.

The results show that as the amount of high amylose flour increased, crispier microwaved pieces with better interfaces were provided. High amylose corn starch did not provide acceptably crisp products even at the 70% substitution level. It was noted that while 100% corn flour substitution did provide a crispy outer coating, the interface was unacceptably pasty. Sample D, containing 50% high amylose flour and 10% of acid converted dextrin of high amylose flour was seen to provide the crispiest piece with the best interface.

TABLE II

| SAMPLE | WHEAT FLOUR SUBSTITUTION IN DRY BATTER MIX | TEXTURE OF PRE-FRIED FROZEN CHICKEN AFTER MICROWAVE RECONSTITUTION | | | |
|---|---|---|---|---|---|
| | | CRISPNESS | RATING | INTERFACE | RATING |
| Control | 97% Wheat Flour | Soggy, oily | 8 | floury | 3 |
| D | 97% Corn Flour (comparative) | Crispy | 2 | pasty | 4 |
| E | 25% High Amylose Corn Flour[a] | Slightly oily, soft | 7 | floury | 3 |
| F | 50% High Amylose Corn Flour[a] | Slightly crispy | 5 | floury | 3 |
| G | 50% High Amylose Corn Flour[a] 10% Modified High Amylose Flour[b] | Crispiest | 1 | best | 1 |
| H | 60% High Amylose Corn Flour[a] | Crispy | 4 | floury | 3 |
| I | 70% High Amylose Corn Flour[a] | Crispy | 3 | good | 2 |
| J | 60% High Amylose Corn Starch[c] (comparative) | Slightly oily, soft | 6 | pasty | 4 |
| K | 70% High Amylose Corn Starch[c] (comparative) | Slightly crispy | 5 | floury | 3 |

[a]The flour contained 70% amylose.
[b]Acid converted dextrin of high amylose corn flour containing 70% amylose prepared by heat treating the flour (adjusted to a pH of 2.0–2.5 with 2.8% hydrochloric acid) for 5 hours to a maximum temperature of 280° F. (138° C.).
[c]The starch contained 70% amylose.

EXAMPLE 3

This example compares batter mixes employing high amylose flour containing about 70% amylose with mixes employing high amylose flour containing about 50% amylose.

Two series of pre-fried chicken thighs corresponding to Samples E, F, and I (batters employing 25, 50 and 70% high amylose flour substitution) were prepared as in Example 2 employing high amylose flour containing either about 70% or about 50% amylose, based on the total starch content of the flour. Samples were frozen for 1, 5, 6, and 13 days then microwaved for comparison.

The results indicated that there was little difference in crispness between samples prepared with the 70% amylose-containing flour and those prepared with the 50% amylose-containing flour. When employing either flour, as the percent substitution of the high amylose flour in the batter mix increased, similar trends to those described in Example 2 were observed. For example, crispness improved as did the interface of the pieces. It was also noted that weepage decreased, and the color of the final product became darker.

EXAMPLE 4

This example illustrates the use of tempura batter mix compositions which contain large amounts of high amylose flour in the preparation of pre-fried bite-size portions of meat which are microwaveable.

One inch cubes of raw chicken and fish were pre-dusted with wheat flour, dipped in batter (Samples L and M, respectively), pre-fried (1 minute at 385° F. (196° C.) and 30 seconds at 400° C. (204° C.) respectively), then frozen immediately. See Table III for batter compositions. After one day the frozen pre-fried pieces were microwaved for 3 minutes rotating each piece after 1.5 minutes. Both batters produced excellent products which were very crisp after microwaving.

TABLE III

| INGREDIENTS | PARTS BATTER RECIPE | |
|---|---|---|
| | L[a] | M[b] |
| Wheat Flour | 10.87 | 16.67 |
| High Amylose Corn Flour (70% amylose) | 34.42 | 60.83 |
| Modified High Amylose Flour[c] (70% amylose) | 34.42 | — |
| High Amylose Corn Starch (70% amylose) | 18.79 | 19.83 |
| Acid Sodium Aluminum Phosphate | 0.75 | 1.33 |
| Sodium Bicarbonate | 0.75 | 1.33 |
| Water | 150 | 125 |

[a]Tempura batter applied to chicken.
[b]Tempura batter applied to fish.
[c]Acid converted dextrin of high amylose corn flour prepared by heat treating the flour (adjusted to a pH of 1.5–2.0 with hydrochloric acid) for 6.5 hours to a maximum temperature of 250° F. (121° C.).

EXAMPLE 5

This example illustrates the effect of adding various amounts of a dextrin of high amylose flour to a batter mix which also contains high amylose flour.

Dry batter mixes were formulated with 17–42% wheat flour, 50% high amylose flour, 5–30% dextrinized high amylose flour (prepared as described in Table II), 1.5% sodium bicarbonate, and 1.5% acid sodium aluminum phosphate. Chicken pieces were coated and fried as in Example 2. After five days in frozen storage, the samples were reconstituted by microwave to an internal temperature of 150° F. (66° C.). The pieces were then evaluated by a panel of 4 for overall crispness, interface and color. The results may be found in Table IV.

TABLE IV

| SAMPLE | % DEXTRINIZED HIGH AMYLOSE FLOUR IN DRY MIX | OBSERVATIONS AFTER MICROWAVE RECONSTITUTION | | |
|---|---|---|---|---|
| | | CRISPNESS | INTERFACE | COLOR |
| N | 5% | slightly oily, slightly crispy | floury | golden brown |
| O | 10% | slightly oily, crispy | good | golden brown |
| P | 20% | slight lacing, slightly gritty, | good | dark brown |

TABLE IV-continued

| SAMPLE | % DEXTRINZED HIGH AMYLOSE FLOUR IN DRY MIX | OBSERVATIONS AFTER MICROWAVE RECONSTITUTION | | |
|---|---|---|---|---|
| | | CRISPNESS | INTERFACE | COLOR |
| Q | 30% | very crispy lacing, flaky, crispiest* | good | unacceptably dark |

*pieces of batter coating blew off during frying.

The results showed that as the amount of dextrinzed high amylose flour was increased, the interface became less floury as well as more crispy; however, the color became darker. It was noted that at 30% substitution, the coating provided very lacy and uneven coverage. Sample 0 containing a total of 60% high amylose flour (including 10% of the dextrinized flour) was rated as the overall best of the series.

EXAMPLE 6

This example illustrates the effect of various ratios of high amylose flour to dextrinized high amylose flour in a batter mix at a constant 60% substitution level.

Dry batter mixes were formulated with 37% wheat flour, 60% high amylose flour mixture, 1.5% sodium bicarbonate and 1.5% acid sodium aluminum phosphate. The dextrinized flour employed was prepared as described in Table II. Chicken pieces were coated and fried as in Example 2. After 5 days in frozen storage, the samples were reconstituted by microwave to an internal temperature of 150° F. (66° C.). The pieces were then evaluated by a panel of 3 for overall crispness, weepage, interface, and color. The results may be found in Table V.

TABLE V

| RATIO OF HIGH AMYLOSE FLOUR: DEXTRINIZED HIGH AMYLOSE FLOUR | OBSERVATIONS AFTER MICROWAVE RECONSTITUTION | | | |
|---|---|---|---|---|
| | Crispness | Weepage | Interface | Color |
| 10:1 | slightly oily, slightly crispy | moderate | floury | golden brown |
| 5:1 | crispy slight lacing | slight | good | darker brown |
| 1:1 | crispiest crumbly | slight | best | unacceptably dark |

The results again showed that as the amount of dextrinized high amylose flour in the mixture increased, the crispness of the product increased and interface improved as the product became darker. It was also noted that increasing levels of the dextrinized flour reduced the weepage of the product. When equivalent amounts of the high amylose flour and the dextrinized flour were used, the product, though crispiest, exhibited undesirable lacing which caused the coating to be crumbly. The sample containing the 5:1 ratio of high amylose flours was again rated the overall best sample of the series.

EXAMPLE 7

This example illustrates the preparation of microwaveable pre-fried food pieces employing the single-pass technique.

Par-boiled chicken thighs are pre-dusted and battered as in Example 2 employing Sample batter I. After draining the excess batter, the pieces are further coated with bread crumbs prior to pre-frying at 385° F. (196° C.) for one minute. After draining the pre-fried pieces, they are immediately frozen. After two days of frozen storage the chicken pieces are reconstituted by microwaving until an internal temperature of 150° F. (66° C.) is obtained. Crispy batter-coated and breaded pieces having a good interface should result.

Summarizing, improved batter mix compositions, intended for use as coatings for pre-fried foodstuffs which are to be ultimately microwaved, are provided by the inclusion of high amylose flour in such mixes. Foodstuffs possessing acceptable crispy outer coatings, heretofor unattainable, are provided when frozen pre-fried products, coated with batters containing high amylose flour, are cooked by microwaving.

The preferred embodiments of the present invention having been described above, various modifications and improvements thereon will now become readily apparent to those skilled in the art. Accordingly, the spirit and scope of the present invention is defined not by the foregoing disclosure, but only by the appended claims.

We claim:

1. In a process for preparing a batter coated, pre-fried microwaveable foodstuff comprising:
   (a) adding an effective amount of water to a farinaceous-based batter mix comprising a farinaceous material selected from the group consisting of starch, flour other than high amylose flour, and mixtures thereof, to form an aqueous batter slurry;
   (b) applying said batter slurry to a foodstuff; and
   (c) partially cooking the batter coated foodstuff in hot fat or cooking oil;
   wherein the improvement comprises adding about 50 to 80 percent, based on batter mix solids, of a high amylose flour containing at least 50% amylose, based on the starch content of said high amylose flour, to said batter mix, whereby said batter coated, pre-fried foodstuff possesses improved crispness after subjecting to microwave cooking.

2. The process of claim 1, wherein said high amylose flour contains about 70% amylose.

3. The process of claim 1, wherein said high amylose flour is a modified or unmodified high amylose corn flour or mixtures thereof.

4. The process of claim 3, wherein said modified high amylose flour is an acid converted dextrin of high amylose corn flour.

5. The process of claim 4, wherein said high amylose flour is a mixture of about 4 to 6 parts unmodified high amylose flour and 1 part acid converted dextrin of high amylose corn flour.

6. The process of claim 5, wherein said mixture is about 5 parts unmodified flour and 1 part dextrin.

7. The process of claim 1, wherein about 60 to 70% high amylose flour is added.

8. The process of claim 1, further comprising the steps of freezing said partially cooked foodstuff and cooking said frozen foodstuff by microwaving.

9. The process of claim 1, wherein said foodstuff is fish or poultry.

10. The process of claim 1, further comprising the step of applying a breading to said batter coated foodstuff prior to partially cooking.

11. The foodstuff produced by the process of claim 8.

* * * * *